United States Patent [19]

James

[11] 3,952,973

[45] Apr. 27, 1976

[54] ENGINE MOUNTING ASSEMBLY

[75] Inventor: Varnell L. James, Enumclaw, Wash.

[73] Assignee: The Boeing Company, Seattle, Wash.

[22] Filed: Dec. 20, 1974

[21] Appl. No.: 534,830

[52] U.S. Cl. ..................................... 244/54; 248/5
[51] Int. Cl.$^2$ ........................................ B64D 29/02
[58] Field of Search ................... 244/54, 53 R, 119; 248/5; 60/39.31

[56] References Cited
UNITED STATES PATENTS

| | | | |
|---|---|---|---|
| 2,355,370 | 8/1944 | Frey | 248/5 |
| 3,352,114 | 11/1967 | Wilde et al. | 244/54 X |
| 3,848,832 | 11/1974 | Stanley et al. | 244/54 |

*Primary Examiner*—Trygve M. Blix
*Assistant Examiner*—Barry L. Kelmachter
*Attorney, Agent, or Firm*—Christensen, O'Connor, Garrison & Havelka

[57] ABSTRACT

A lightweight engine mounting assembly for attaching an engine to the wing of an airplane includes an outboard beam, an inboard beam, a forward annular stabilizing member and upper and lower, rear stabilizing members. Rearward extensions of the inboard and outboard beams have upper portions that extend rearwardly over the upper airfoil surface of a wing and lower portions that extend rearwardly and under the lower surface of the wing. The rearward extensions of the inboard and outboard beams are attached to the front main spar and to the upper and lower skins of the wing at the location of the wing ribs. The engine mount has a lower opening, bounded by the lower portion of the forward stabilizing member, the lower edges of the beams, and the lower, rear stabilizing member, and an upper opening bounded by the upper portion of the forward stabilizing member, the upper edges of the beams, and the upper, rear stabilizing member. Suitably shaped, removable cowl sections are located in the upper and lower openings. An annular air inlet ring is attached to and extends forwardly from the forward annular stabilizing member. A panel having an inverted, substantially U-shaped, transverse cross-section extends rearwardly from the upper portion of the rearward stabilizing ring to form the upper portion of an exhaust nozzle for a jet propulsion engine. The beams of the engine mounting assembly are constructed from appropriately shaped, longitudinally extending box beams interconnected by transversely extending rib members. The box beams and the rib members are covered on both the inner and outer sides with honeycomb panels. The stabilizing members are constructed from suitably shaped box beams.

16 Claims, 8 Drawing Figures

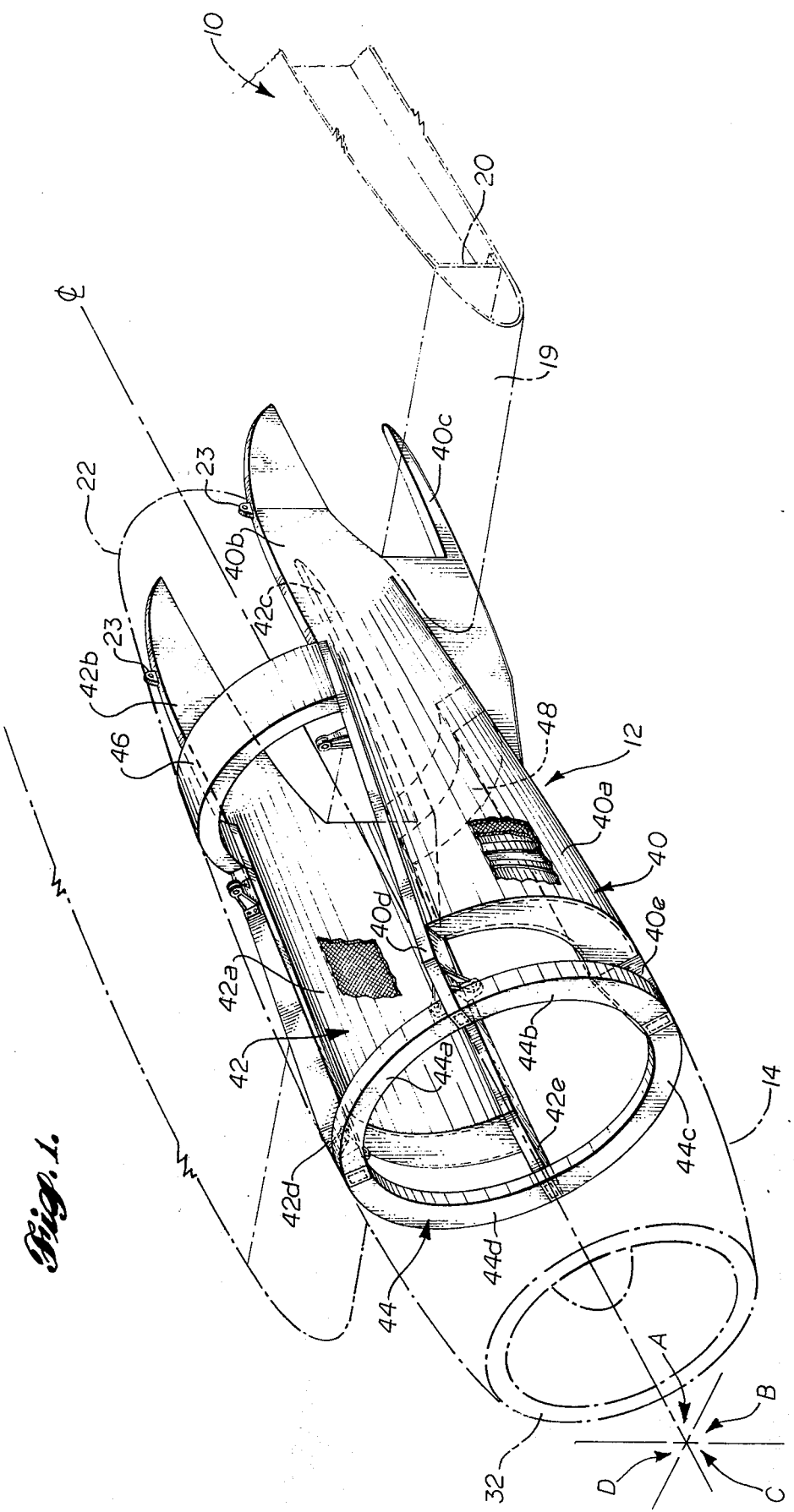

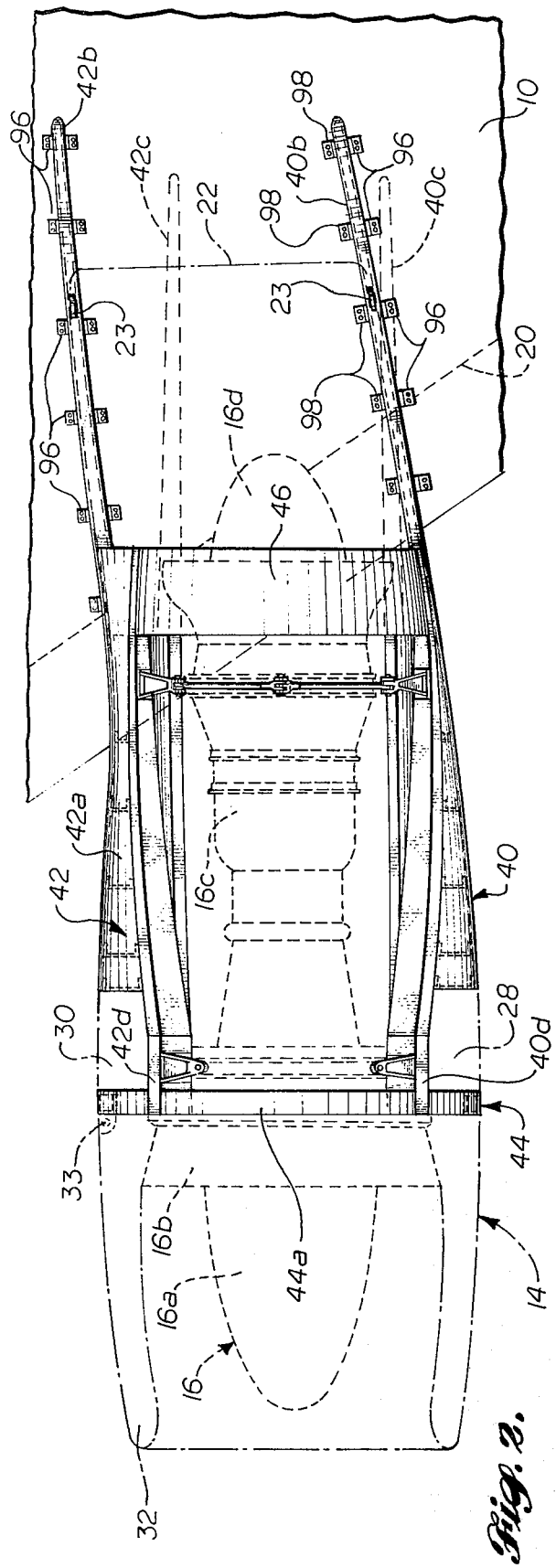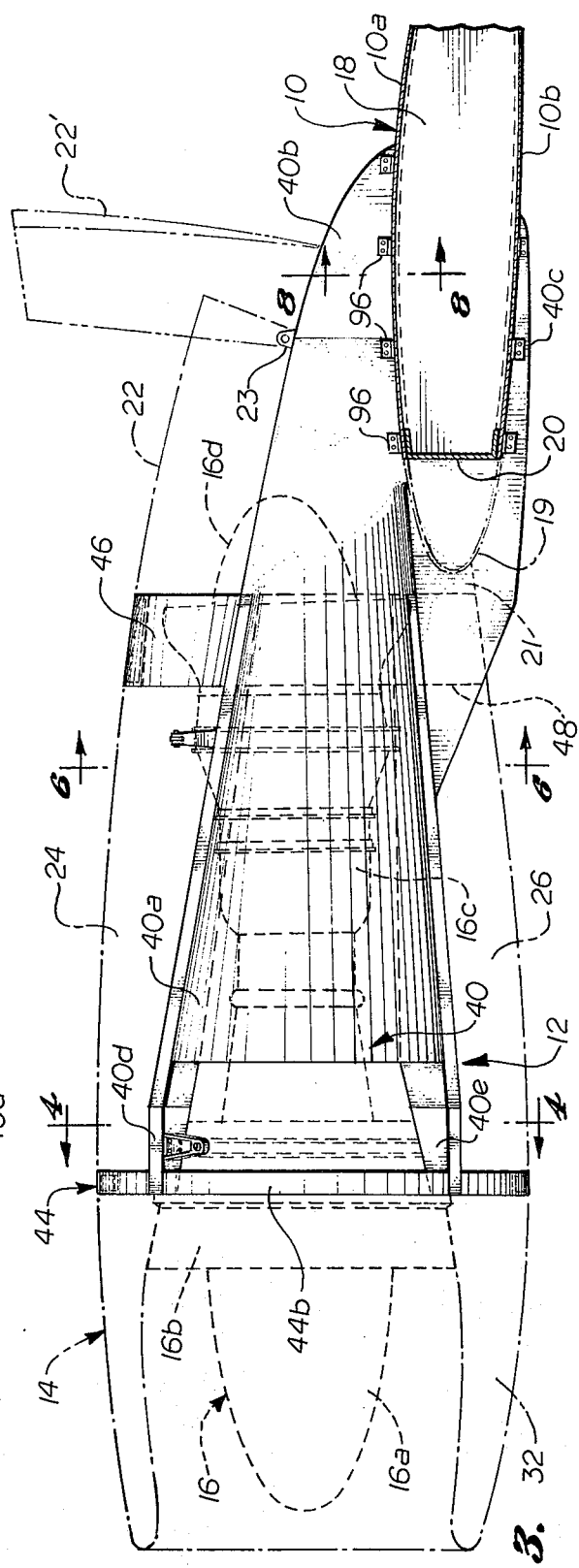

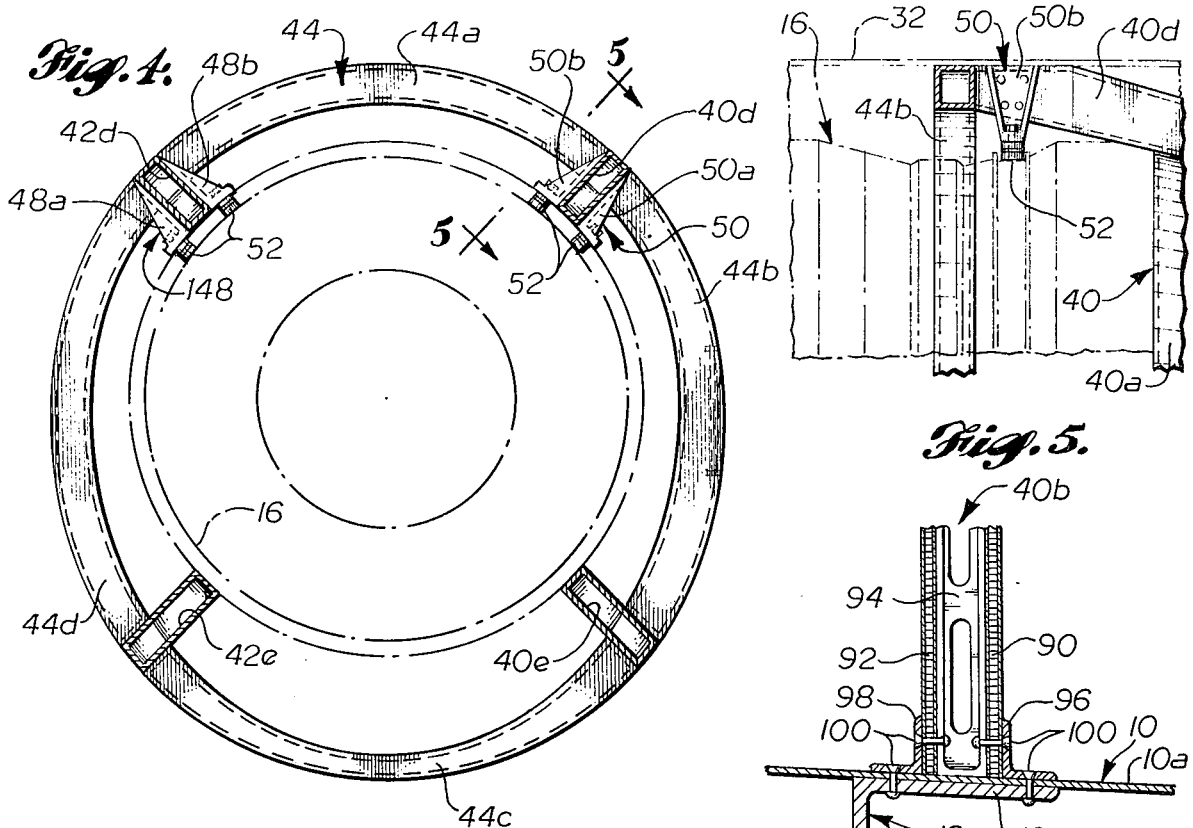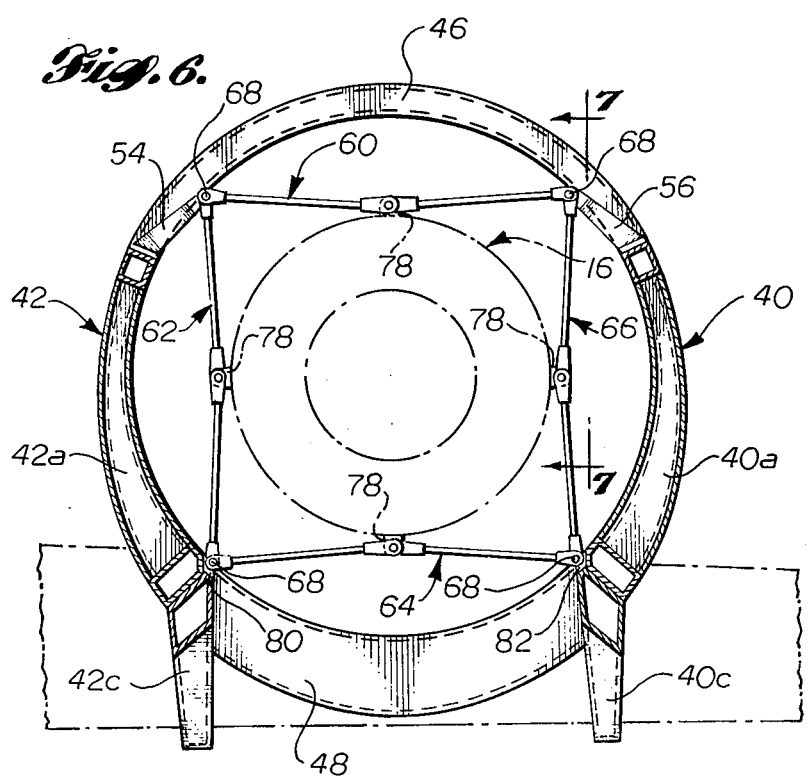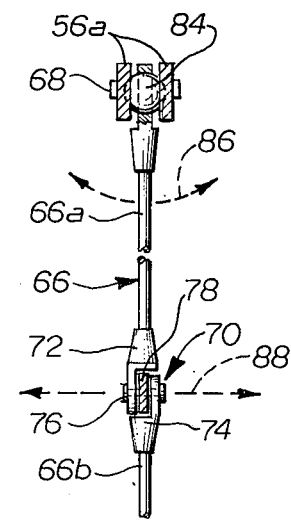

ENGINE MOUNTING ASSEMBLY

BACKGROUND OF THE INVENTION

The present invention relates to an engine mounting assembly and more particularly to an engine mounting assembly for attaching a jet propulsion engine to the wing of an aircraft.

It is a broad object of the present invention to provide an engine mounting assembly for fastening an aircraft engine to an aircraft wing. In this context, other objects of the invention are to provide a lightweight engine mounting assembly for cantilevering an engine forwardly of the leading edge of the wing; an engine mounting assembly that can be connected directly to the wing without additional trusswork or supporting structure in the wing other than that required for the wing itself; to provide an engine mounting assembly with a slim, aerodynamic profile that can be integrated with a cowl structure while maintaining the cowl and mounting assembly thickness at a minimum; to provide an engine mounting assembly that will facilitate engine removal in both upward or downward directions without moving the engine a substantial distance along its longitudinal axis; to provide an engine mounting assembly for a turbofan jet propulsion engine; to provide an engine mounting assembly with integrated, removable cowl portions to ease access to the engine for repair and removal; and to provide an engine mounting structure that can withstand vertical loads, horizontal loads and torque or twisting loads, such as caused by turbulent flying conditions, emergency landing conditions and jet propulsion engine seizure.

SUMMARY OF THE INVENTION

The foregoing objects, and other objects that will become apparent to those of ordinary skill in the art upon reading the following specification, are fulfilled by an assembly for mounting an engine to an aircraft wing in a manner to support the engine in a cantilevered fashion forwardly of the leading edge of the wing. For purposes of definition, the engine mounting assembly has a longitudinal axis about which lie in space upper and lower inboard quadrants and upper and lower outboard quadrants. The longitudinal axis of the engine mounting assembly extends forwardly in a substantially chordwise direction from the aircraft wing. The assembly includes an inboard beam having a forward section and a rearward section, an outboard beam having a forward section and a rearward section, means for securing the rearward sections of the inboard and outboard beams to the wing, and means for securing the engine at a central location along the longitudinal axis between the inboard and outboard beams. The forward sections of both the inboard and outboard beams project forwardly from the wing. In transverse section, both the forward and rearward portions of the forward sections of both the inboard and outboard beams extend from the respective upper quadrants to the respective lower quadrants. The rearward sections of both the beams have upper and lower portions that are joined to and extend longitudinally rearwardly from the respective forward sections of the beams. The upper portions of the rearward sections extend rearwardly over the upper surface of the wing while the lower portions of the rearward sections extend rearwardly under the lower surface of the wing. The rearward sections both have a forwardly extending recess, the upper edges of which are defined by the respective lower edges of the upper portions of the rearward sections and the lower edges of which are defined by the respective upper edges of the lower portions of the rearward sections. The upper and lower edges of the recess conform substantially to the shape of the respective upper and lower surfaces of the wing. The upper edges of the forward sections of the beams are spaced from each other to leave an opening through which the engine can be removed in an upward direction. Likewise, the lower edges of the two beams are spaced apart to leave an opening for removal of the engine in a downward direction. In the preferred embodiment of the invention, the assembly includes an arcuate, upper stabilizing member that is oriented transversely to the longitudinal axis. The upper stabilizing member is connected to the outboard beam and extends from the upper outboard quadrant to the upper inboard quadrant where it is connected to the inboard beam.

BRIEF DESCRIPTION OF THE DRAWINGS

A better understanding of the present invention can be derived by reading the ensuing specification in conjunction with the accompanying drawings wherein:

FIG. 1 is an isometric view of the engine mounting assembly of the present invention showing the integrated cowl and a wing to which the assembly is connected in reference outline;

FIGS. 2 and 3 are plan and elevation views, respectively, of the engine mounting assembly with the cowl and a jet propulsion engine shown in reference outline;

FIG. 4 is a cross-sectional view of the engine mounting assembly taken along section line 4—4 of FIG. 3 showing the forward stabilizing member and engine attachment flanges;

FIG. 5 is a sectional view of a portion of the engine mounting assembly taken along section line 5—5 of FIG. 4;

FIG. 6 is a cross-sectional view of the engine mounting assembly taken along section line 6—6 of FIG. 3 showing the rear stabilizing members and engine attachment flanges and links;

FIG. 7 is an enlarged detail view of a portion of the attachment structure taken along a section line similar to 7—7 in FIG. 6; and FIG. 8 is an enlarged, detail cross-sectional view of the means for attaching the engine mounting assembly to the wing taken along a section line similar to section line 8—8 in FIG. 3.

DESCRIPTION OF PREFERRED EMBODIMENTS

Referring first to FIG. 1, a swept-back aircraft wing 10 of relatively conventional design supports a preferred embodiment of the engine mounting assembly generally designated 12. The assembly 12 is secured to the wing 10 and projects forwardly beyond the leading edge of the wing. In the preferred embodiment, the engine mounting assembly is configured to house and mount a jet propulsion engine, and particularly a jet propulsion engine of the turbofan type. If desired, the engine mounting assembly can be constructed to mount a conventional turbine engine, a turboprop engine, or even a reciprocating type engine on an aircraft wing. In the preferred embodiment illustrated, the engine mount is constructed to house the turbofan engine in conjunction with the cowl so that both the primary effluent from the turbine and the secondary effluent from the fan are exhausted in a rearward direction over the upper airfoil surface of the wing 10. This engine configuration is commonly referred as an upper surface blowing engine. The engine mounting assembly can be employed for other mounting arrangements if desired, for example, the engine mounting assembly can be reconstructed so that the exhaust effluent from the engine is internally split so that a portion of the effluent flows over the upper airfoil surface of the wing and so that a portion of the effluent flows under the wing.

Referring to FIGS. 1, 2 and 3 conjointly, the wing 10 has a main front spar 20 that extends spanwise along the wing and, as seen in FIG. 3, a structural rib 18 that extends chordwise along the wing. It is to be understood that the wing includes a plurality of such ribs spaced at suitable locations along the span of the wing. The front portion of the rib 18 is conventionally joined to the front wing spar 20. A leading edge panel 19 is conventionally affixed to the front spar 20 and is shaped to form the leading edge section of a conventional airfoil. The wing 10 has an upper airfoil surface skin 10a and a lower surface skin 10b that are affixed in a conventional manner to the spar and to the ribs.

Generally, the engine mounting assembly comprises five major components, an outboard beam 40, an inboard beam 42, a forward stabilizing member 44 and upper and lower, rear transverse stabilizing members 46 and 48. A cowl structure, shown in reference outline is affixed to and integrated with the engine mounting assembly. The cowl structure includes six removable, or if desired, permanently affixed panels, an inverted U-shaped thrust reversing bucket 22 located at the upper rearward portion of the engine mounting assembly, an upper central cowl panel 24, a lower central cowl panel 26, a central outboard cowl panel 28, a central inboard cowl panel 30 and a forward cowl panel 32 that serves as the annular inlet ring for the turbofan engine. As best seen in FIGS. 2 and 3, the turbofan engine 16 includes a nose cone 16a, a fan section 16b, a turbine engine section 16c, and a tail cone 16d.

For purposes of description, the center line of the engine, generally designated "CL" will be used as a reference line for describing the engine mounting assembly. The engine center line will serve as a longitudinal reference axis about which lie in the transverse dimension four reference quadrants, an upper outboard quardant A, a lower outboard quadrant B, a lower inboard quadrant C, and an upper inboard quadrant D. It is not intended that the broad concepts of the invention disclosed herein be necessarily limited by this definitional geometry since these geometric references are chosen to facilitate the description of the preferred embodiment.

Weight and structural requirements in most aircraft dictate that the engine mounting assembly be lightweight and yet relatively strong. The engine mounting assembly must be capable of withstanding the severe loads placed upon the structure, especially the transverse loads, both vertical and horizontal, and the torque loads that are exerted circumferentially about the longitudinal axis of the structure. The transverse loads are normally exerted on the structure during normal flight of the aircraft, and are especially severe in turbulent conditions, and upon landing of the aircraft. The torque loads are placed upon the structure during acceleration and deceleration of a jet propulsion engine and become most severe if engine seizure occurs. Engine seizure is that condition where a bearing or other catastrophic failure causes the turbine compressor and fan and associated rotating assembly to slow from operational speeds on the order of 15,000 to 20,000 r.p.m. to 0 r.p.m. in a matter of a second or a fraction thereof. If the engine structure is not capable of withstanding these loads, of course, it is inadequate for the intended purpose. Accordingly the inboard and outboard beams of the engine mounting assembly are composed of suitably shaped inner and outer honeycomb panels, as can be seen in the cutaway portion of the outboard beam 40 in FIG. 1. The longitudinal edges of the inner and outer honeycomb panels are joined by longitudinally extending box beams and are separated and formed by the ribs that extend transversely between and are also joined to the box beams. The stabilizing members are also box beams and in longitudinal section have a rectangular or square cross-section. The forward edge or surface of the inboard and outboard beams can be, if desired, covered by a honeycomb skin that is oriented along a plan that is generally transverse and preferably perpendicular to the longitudinal reference line. Whether or not this forward skin is used, as depicted, is a matter of design choice and structural requirement. This construction technique provides maximum strength while achieving minimum weight. It is to be understood that any of a variety of available construction techniques can be employed to manufacture the engine mounting assembly of the present invention.

Again referring to FIGS. 1 through 3, the outboard beam 40 is located in the upper and lower outboard quadrants A and B and generally has a longitudinal dimension spaced outwardly from and extending along the longitudinal reference axis. The upper and lower portions 40b and 40c of the rearward section of the outboard beam are attached to the wing 10 and project forwardly from the wing generally to the region adjacent the rear stabilizing members 46 and 48. The forward section 40a of the outboard beam 40 extends forwardly from the region of connection of the rear stabilizing members 46 and 48. The forward section 40a of the outboard beam is arcuate circumferentially about the longitudinal reference axis. The inner wall of the forward section 40a serves as a portion of the outer surface of the annular fan channel formed between the outer wall of the turbine engine 16 and the inner surfaces of the engine mounting assembly and the cowl structure. The outer wall of the outboard beam 40 has a smooth, continuous outer surface, which in conjunction with the adjacent outer surface of the cowl structure and the rest of the mounting assembly form an aerodynamically clean engine nacelle. The upper longitudinally extending edge of the outboard beam 40 is poistioned in the upper outboard quadrant A while the lower longitudinally extending edge of the outboard beam 40 is positioned in the lower outboard quadrant B. The upper and lower longitudinally extending edges of the outboard beam taper toward each other as they extend from the forward portion of the forward section 40a to the rearward portion of the forward section 40a of the outboard beam.

The rearward section of the outboard beam is separated for purposes of description into an upper portion 40b and a lower portion 40c. The upper and lower portions 40b and 40c of the rearward section of the outboard beam are integral with and extend rearwardly from the forward section. The upper and lower portions terminate rearwardly from the leading edge of the wing 10. A rearwardly extending and rearwardly opening recess is formed in the rearward section of the outboard beam. The recess has an upper edge, a lower edge and a forward edge. The outline of the upper edge of the recess is defined by the lower longitudinally extending edge of the upper portion 40b of the rearward section of the outboard beam 40. The lower edge has the outline of the lower edge of the recess defined by the upper longitudinally extending edge of the lower portion 40c of the rearward section of the outboard beam 40. The outline of the forward edge of the recess generally extends in a vertical direction relative to the longitudinal reference line from the lower outline of the recess to the upper outline of the recess. When installed on a wing, the forward edge of the recess abuts the forwardly facing surface of the main forward spar 20. The upper outline of the recess conforms to the shape of the upper surface of the wing from a location adjacent the forward spar 20, and runs to the rearward termination of the upper portion 40b of the rearward section of the outboard beam 40. Likewise, the lower outline of the recess conforms to the shape of the lower surface of the wing from a location adjacent the forward main spar 20 and runs in a chordwise direction rearwardly to the termination of the lower portion 40c of the rearward section of the outboard beam 40.

The forward and rearward beam sections are generally integrally constructed. The elements of the beam are joined by conventional techniques, such as welding. The bottom portion 40c of the rearward section of the outboard beam 40 is generally vertically oriented relative to the longitudinal reference line and the wing. The upper edge of the bottom portion 40c of the rearward section is joined to the bottom edges of the forward section 40a and the upper portion 40b of the rearward section of the outboard beam 40 and extends from a location forwardly of the position of the rear stabilizing members to a location rearwardly of the rear stabilizing members. This joint terminates forwardly of and adjacent the forwardly facing surface of the main spar 20 of the wing and adjacent the intersection of the upper and forward outlines of the recess in the rearward section of the beam 40. Both the inside and the outside walls of the forward section of the outboard beam fair into the upper portion 40b of the rearward section of the outboard beam 40. The upper portion 40b of the rearward section of the outboard beam is generally vertically oriented relative to the longitudinal reference line and the wing rearwardly of the rear stabilizing member 46. In summary, the forward section 40a of the outboard beam 40 is arcuate in a circumferential direction relative to the longitudinal reference line while the rearward section of the beam is generally vertically oriented, although it is to be realized that the outer surfaces of the beam sections are faired into each other as smoothly as possible to minimize aerodynamic drag on the outside of the beam and to minimize energy loss in the engine exhaust stream along the inside of the beam.

Still referring to FIGS. 1, 2 and 3 the inboard beam 42 is generally a mirror image of the outboard beam 40, although there are some contour variances especially discernible in the plan view (FIG. 2). These variances are dictated primarily by the swept back leading edge of the wing to which the mounting assembly is secured. The inboard beam 42 has a forward section 42a and upper and lower portions 42b and 42c, respectively, forming the rearward section of the inboard beam 42. Like the outboard beam, the forward section 42a of the inboard beam is arcuate in a circumferential direction relative to the longitudinal reference line. The inboard beam extends forwardly from the wing and terminates forwardly of the wing at a location generally juxtaposed on the opposite side of the longitudinal reference line from the forward termination of the inboard beam. The upper longitudinally extending edge of the forward section 42a of the inboard beam is located in the upper inboard quadrant while the lower longitudinally extending edge of the forward section 42a of the inboard beam generally lies in the lower inboard quadrant. The circumferential or arcuate dimension of the forward section of the inboard beam is greater at its forward termination than in the region adjacent the rear stabilizing member 46. Thus, the longitudinally extending, upper and lower side of the forward section 42a of the inboard taper toward each other as they extend rearwardly. Again, the inner and outer walls of the forward section 42a of the inboard beam fair smoothly into the upper portion 42b of the rearward section of the inboard beam while the bottom portion 42c of the inboard beam is generally vertically oriented relative to the reference line and to the wing.

The rearward section of the inboard beam also contains a recess defined by the upper and lower portions 42b and 42c of the rearward section. The upper outline of the recess, formed by the lower edge of the upper portion 42b, in the inboard beam conforms to the shape of the upper surface of the wing 10 while the lower outline of the recess, formed by the upper edge of the lower portion 42c, conforms to the shape of the lower surface of the wing 10. Again, the forward outline of the recess is generally vertically oriented and abuts the forwardly facing surface of the main spar 20 of the wing 10. Due to the nature of the sweep of the leading edge of the wing, the forward outline of the recess of the inboard beam is located forwardly from the forward outline of the outboard beam. The upper edge of the bottom portion 42c of the rearward section is joined to the bottom edges of the forward section 42a and the upper portion 42b of the inboard beam and extends from a location forwardly of the rear stabilizing member 46 to a location rearwardly of the rear stabilizing member 46. The rearward termination of the upper forward edge of the bottom portion 42c of the rearward section is located forwardly of and adjacent the main spar 20 and adjacent the intersection of the upper and forward outlines of the recess in the rearward section of the inboard beam.

The upper edges of the upper portions 42b and 40b of the inboard and outboards beams extend rearwardly from the region of the upper rear stabilizing member 46. The rearward end portions of the upper edges also extend downwardly toward the upper surface of the wing and fair into the surface of the wing. The lower edges of the lower portions 40c and 42c of the outboard and inboard beams extend first downwardly from their respective forward connection points to the lower edges of the forward sections of the beams and then extend longitudinally rearwardly. The rearward ends of the bottom edges of the beams taper upwardly and fair into the bottom surface of the wing. The upper edges of the inboard and outboard beams are transversely spaced from each other to leave a longitudinally extending gap through which the engine, in the preferred embodiment turbofan engine, can be removed in an upward direction. Likewise, the lower longitudinally extending edges of the beams are transversely spaced from each other to leave a bottom longitudinally extending opening through which the engine assembly can be removed in a downward direction.

Referring to FIGS. 1 and 2, the upper portions 42b and 40b of the inboard and outboard beams sweep relatively inwardly in the illustrated embodiment and then straighten out and extend rearwardly in a straight line generally parallel to the longitudinal reference line. The curvature of the upper portions of the inboard and outboard beams is necessitated by the specific application and environment in which the engine mounting assembly of the preferred embodiment is employed. As noted above, the wing 10 has a generally swept back leading edge. That is, it sweeps rearwardly from the inboard side of the engine mounting assembly to the outboard side of the engine mounting assembly. As the engine exhaust effluent, and more specifically the fan air, impinges upon the inner lower portion (not specifically shown) of the outer surface of the annular fan channel, which is oriented substantially along the swept back line of the leading edge of the wing, the exhaust effluent will tend to skew slightly outwardly relative to the longitudinal reference line to match the aerodynamic flow direction of the air over the upper surface of the wing. Since it is most desirable for the effluent to exhaust directly rearwardly relative to the aircraft, the tendency to skew must be compensated for. Thus the upper portions 40b and 42b are swept slightly inwardly before extending rearwardly to their termination on the upper surface of the wing. This geometry redirects the exhaust effluent longitudinally rearwardly to compensate for the slight skewing effect caused by the swept back wing. If the engine mounting assembly of the present invention were to be used with a wing having a conventional leading edge that is not swept back, the upper portions of the rearward sections of the inboard and outboard beams would be shaped so that they would extend directly rearwardly from the upper rear stabilizing member 46.

Referring to FIGS. 1, 2, 3 and 6, the upper edges of the inboard and outboard beams are joined together by transversely extending upper and lower, rear stabilizing members 46 and 48. The upper rear stabilizing member has a transverse shape which generally conforms to an inverted U-shaped, or a segment for an annulus, that is circumferentially arcuate relative to the longitudinal reference line. The longitudinal dimension of the upper stabilizing member is only a fraction of the longitudinal extent of the inboard and outboard beams. The upper rear stabilizing member is located forwardly of and adjacent the relative location of the leading edge of the wing when the assembly is mounted on the wing. The inner wall of the stabilizing member 46 serves as a portion of the outer surface of the annular fan duct while the outer wall of the upper stabilizing member 46 forms a portion of the outer surface of the engine nacelle.

As can best be seen in FIGS. 3 and 6, a rear lower stabilizing member 48 is positioned below the upper stabilizing member 46 and extends generally transversely between the bottom edges of the inboard and outboard beams 42 and 40. The lower stabilizing member 48 is generally arcuate in the circumferential direction relative to the longitudinal reference line. When viewed in cross-section, the beams and the upper and lower rear stabilizing members form a annulus with a generally circular inner periphery and a generally ovoid outer periphery. The lower rear stabilizing member has a radial thickness generally greater than the upper stabilizing member. The inner wall of the lower rear stabilizing member 48 serves as a portion of the outer surface of the annular fan channel while the outer wall of the lower, rear stabilizing member 48 serves as a portion of the outer surface of the engine nacelle. The longitudinal dimension of the lower stabilizing member 48 is substantially the same as the longitudinal dimension of the upper rear stabilizing member 46. The upper and lower erear stabilizing members 46 and 48 serve to structurally stabilize and transfer loads exerted on each of the beams to the other beam and thus distribute any forces that may be concentrated in one or the other of the inboard and outboard beams. The upper and lower rear stabilizing members 46 and 48 are joined to the inboard and outboard beams by conventional fabrication techniques such as riveting, welding or the like. If desired, the upper and lower rear stabilizing rings can be bolted by appropriate flangework and fastening means so that they can be removed for better access to the engine and for modular repair of the structure. As shown in reference outline in FIG. 3, a fairing panel 21 forming a portion of the cowling extends rearwardly from the rearward edge of the lower rear stabilizing member 48 and fairs into the leading edge panel 19 of the wing 10.

Referring back to the forward sections of the inboard and outboard beams, as shown in FIGS. 1, 2, 3 and 4, each of the beams have upper and lower forwardly projecting arms 40d and 40e on the outboard beam and 42d and 42e on the inboard beam. As the preferred embodiment is constructed, these forward projections are forward extensions of the upper and lower longitudinally extending edge box beams forming a portion of the upper and lower beams. A forward annular stabilizing ring 44, oriented, generally transversely to the longitudinal reference line, is secured to the forward portions forwardly extending arms 40d, 40e, 42d and 42e on the outboard and inboard beams. The forward stabilizing ring again serves as a structure stabilizing member for the forward portion of the engine mounting assembly. The forward stabilizing ring 44 is comprised of 4 segments, an upper segment 44a, an outboard segment 44b, a lower segment 44c, and an inboard segment 44d. Each of these segments are arcuate in the circumferential dimension relative to the longitudinal reference line. When viewed in cross-section, the segments and the forward ends of the forwardly extending arms form a complete annulus surrounding the longitudinal reference line. The upper segment is joined to the forward end of the upper forward projection 42d on the inboard beam 42 in the upper inboard quadrant. One end of the upper segment 44a extends arcuately in a generally outward direction and has its other end joined in the upper outboard quadrant to the forward end of the upper forward projection 40d of the outboard beam 40. The outboard segment 44b is joined to the forward end of the forward projection 40d on the outboard beam and extends arcuately in a generally downward direction and is joined in the lower outboard quadrant to the forward end of the lower forward projection 40e of the outboard beam 40. The lower segment 44c is joined to the forward end of the lower forward projection 40e on the outboard beam and extends arcuately in a generally inward direction and is joined to the forward end of the lower forward projection 42e on the inboard beam 42 in the lower inboard quadrant. The inboard segment 44d is joined to the forward end of the lower forward projection 42e and extends arcuately in a generally upward direction and is joined to the forward end of the upper forward projection 42d in the upper inboard quadrant.

Each of the stabilizing segments can be permanently secured to the forward projections, or can be removably affixed by suitable flange work and fasteners. If removably fastened, the engine can be easily removed in a downward and upward direction with little longitudinal movement of the engine. For example, the engine can be removed upwardly by removing the upper segment of the forward stabilizing members and by disconnecting the engine from its mounting structure (described later). Thereafter the engine can be moved forwardly far enough so that the fan shroud clears the forward end of the beams and thereafter lifted upwardly out of the assembly.

As shown in reference outline in FIGS. 1 through 3, a thrust reversing door 22 having a generally inverted U-shaped configuration extends longitudinally rearwardly from the rearward termination of the upper rear stabilizing member. The bottom longitudinally extending edges of the thrust reversing door 22 mate with the upper edges of the upper portions 42b and 40b of the rearward sections of the inboard and outboard beams. The upper portions of the inboard and outboard beams and the thrust reversing door 22 form an exhaust nozzle for the engine. The rearward termination of the upper portions 42b and 40b of the rearward sections of the inboard and outboard beams and the rearwardly terminating edge of the thrust reversing bucket 22 form the exhaust opening. If desired, upwardly extending transversely aligned flanges 23 can be integrated into the upper edges of the upper portions 40b and 42b of the beams at suitable locations to provide hinge attachment points for the thrust reversing bucket 22. As shown in FIG. 3, the forward portion of the thrust reversing bucket 22 can be swung upwardly and rearwardly about the transverse hinge axis suitably formed at the flanges 23 so that the exhaust effluent traveling rearwardly through the exhaust nozzle impinges upon the inner surface of the thrust reversing bucket 22 and is diverted upwardly and forwardly relative to the longitudinal reference line. In this manner, the thrust reversing bucket 22 serves to reverse the exhaust stream direction and thus provide a net rearward thrust on the aircraft for braking purposes after landing and can be raised for engine exhaust nozzle removal and maintenance.

Referring to FIGS. 2 and 3 the lower cowl section 26 and the upper cowl section 24 are both only shown in outline. The upper cowl section is designed to fill in the space between the upper segment of the forward stabilizing ring 44 and the upper rear stabilizing member 46 and between the upper edges of the inboard and outboard beams 42 and 40. The inner wall of the upper cowl section is formed so as to provide a suitable outer surface for the annular fan channel. The outer wall of the cowl section conforms in shape to the exterior surface of the entire engine nacelle. Likewise, the lower cowl section 26 is designed to fill the space between the lower segment of the forward stabilizing ring and the lower rear stabilizing member 48 and between the lower edges of the forward sections of the inboard and outboard beams. The inner wall of the lower cowl section 26 forms a portion of the outer surface of the annular fan channel. The outer wall of the lower cowl section also conforms to the shape of the outer surface of the nacelle structure. Suitably shaped side cowl sections 28 and 30 are also provided to fill the space between the rearwardly facing surfaces of the side segments of the forward stabilizing ring and the forward terminii of the forward sections of the beams 40 and 42. The upper and lower cowl sections are arcuate in the circumferential direction as they extend from the edges of the outboard beam to the edges of the inboard beam. A cross-section taken through the cowl sections and the beam would reveal an annular geometry. If desired, conventional construction techniques can be employed to removably secure the cowl sections in place so that they can be displaced for access to and removal of the engine.

Referring to FIGS. 1, 2 and 3, the forward inlet ring 32 is a generally frustoconically shaped shell that is attached to the forwardly facing surface of the forward stabilizing ring 44. The outer wall of the forward inlet ring 32 fairs rearwardly into the outer surface of the forward stabilizing ring 44. The inlet ring 32 can be removably mounted using conventional techniques to the forward stabilizing ring. If desired, hinge structure can be provided so that the inlet ring 32 can be pivoted to the side about a generally vertical axis 33 relative to the reference line (see FIG. 2) for access to the forward portion of the turbofan engine and to the fan blade structure. Other variations of cowl structure and attachment means can be employed by one of oridinary skill in the art, depending upon the particular application.

Referring now to FIGS. 4 and 5, the forward portion of the turbofan engine 16, shown in reference outline, is attached to the upper forwardly projecting arms 40d and 42d of the beams via a relatively simple flange and fastener assemblies 148 and 50. Flanges 48a and 48b are affixed by conventional construction techniques, such as riveting or welding, to the upper and lower radial surfaces of the forwardly projecting arm 42d. Flanges 50a and 50b are similarly affixed to the radial surfaces of the forwardly projecting arm 40d. The flanges 48a, 48b, 50a and 50b have circumferentially oriented shoulders that are positioned on the inner ends of the flanges. These circumferentially oriented shoulders have radial bores that hold suitable conventional fasteners, such as bolts or quick release lock fasteners 52. These fasteners are suitably connected to the engine in a conventional manner to suspend the forward portion of the engine within the engine mounting assembly.

Referring to FIGS. 6 and 7, the rearward portion of the engine 16 is secured to the engine mounting assembly via a linkage network including upper linkage 60, inboard linkage 62, lower linkage 64, and outboard linkage 66 arranged in a substantially square array. Successive ends of each of the linkages 60, 62, 64 and 66 are joined at common locations by pins 68 to four connection points provided on the engine mounting assembly. The central portion of the linkages are fastened to suitable flanges 78 provided at appropriate locations on the engine 16. Upper connections points are provided through arms 54 and 56 that are affixed to extend upwardly and inwardly from the box beams forming upper edges of the inboard and outboard beams 42 and 44, respectively, adjacent and forwardly of the upper, rear stabilizing member 46. The upper terminii of the arms 54 and 56 are located within the annular channel and contain longitudinally extending bores to which the ends of certain linkages 60, 62, 64 and 66 are attached by suitable fasteners. Inwardly extending lower flanges 80 and 82 are also secured by conventional construction techniques to the box beams forming lower edges of the inboard and outboard beams, respectively, at a location below the upper connecting arms 54 and 56. The lower flanges have longitudinally extending bores located within the annular fan channel. The opposite ends of the upper linkage 60 extend between arms 54 and 56 and are joined to a flange 78 extending radially upwardly from the engine 16 by suitable connecting pins. The inboard and outboard linkages, 62 and 66 respectively, have their upper ends connected to the respective connecting pins 68 securing linkage 60 to the arms 54 and 56. The lower inboard flange 80 serves as the common connection point for the bottom end of the inboard linkage 62 and the inboard end of the bottom linkage 64. Likewise, the lower outboard flange 82 serves as the connection point for the outboard end of the lower linkage 64 and the lower end of the outboard linkage 66.

As best seen in FIG. 7, a view of arm 56 and outboard linkage 66, chosen as representative of the linkage connections, the inner end 56a on the upper end of the arm 56 has a generally yoke-like configuration. A ball, 84, is positioned between the arms of the yoke and a suitable fastener 68 is inserted through the arms of the yoke and through an enlarged bore in the ball, 84. Each of the linkages comprises two link members, for example, outboard linkage 66 is composed of link members 66a and 66b. Mutually adjacent ends of the two link members 66a and 66b are joined by a flexible coupling generally designated 70. This coupling allows connecting linkage to flex in a radial dimension relative to the longitudinal reference line as well as providing a slight degree of freedom in the longitudinal dimension, as graphically illustrated by the arrow 88 running through the coupling 70. The coupling 70 comprises a first L-shaped flange 72 affixed to one end of link member 66a and a mirror image L-shaped flange 74 connected to the adjacent end of the other link member 66b. The two L-shaped flanges are joined by pivot pin 76 extending through longitudinally aligned bores in the flanges 72 and 74. This pivot pin also extends through a suitable bore in the mounting flange 78 provided on the outboard side of engine 16. As the engine contracts and expands relative to the engine mounting assembly, the central portion of the linkages can move fore and aft relative to the mounting assembly. If desired, the ball joint can be omitted and replaced with a fixed coupling. The linkage shown is sufficiently flexible to still allow the engine to expand and contract both radially and longitudinally.

Referring now to FIGS. 2, 3 and 8, the means by which the engine mounting assembly 12 is affixed to the wing 10 is shown. A plurality of L-shaped flanges 96 each have a generally vertical arm and a generally horizontal arm. The horizontal arms of the flanges are positioned adjacent the upper surface of the wing 10 and the vertical arms are positioned adjacent the inboard side of the upper portion 40b of the rearward section of the outboard beam 40. Likewise, a plurality of L-shaped flanges 98 of similar construction are positioned along the inboard side of the upper portion 40b of the rearward section of the outboard beam 40b in juxtaposed, paired relationship with the flanges 96 on the outboard side. Similar flanges are also positioned on the inboard and outboard sides of the lower portion 40c of the rearward section of the outboard beam 40 and on the inboard and outboard sides of the upper and lower portions 42b and 42c of the rear sections of the inboard beam.

FIG. 8 is a sectional view through the upper portion 40b of the rearward section of the outboard beam, looking rearwardly from a location immediately forwardly of one of the flange pairs 96 and 98. The upper portion 40b of the rearward section of the outboard beam includes an exterior honeycomb panel 90 and an interior honeycomb panel 92. The honeycomb panels comprise transversely extending cells that are joined in a conventional honeycomb construction to inner and outer skins. Rib members 94 are joined to the inner surfaces of the honeycomb panels to provide transverse rigidity and to properly space the exterior and interior honeycomb panels. The vertical arm of the L-shaped flanges 96 and 98 abut, respectively, the exterior surface of the exterior honeycomb 90 and the exterior surface of the interior honeycomb 92. The generally horizontal arms of the L-shaped flanges 96 and 98 abut the upper surface of the upper skin 10a of the wing 10. The wing rib 18 is positioned immediately below the skin 10a and below the upper portion 40b of the rearward section of the outboard beam. The wing rib 18 has a vertical web 18a and an upper horizontal arm 18b that abuts the lower, interior surface of the upper skin 10a of the wing 10. The flanges 96 and 98 are joined by rivets 100 or by quick-disconnect fasteners or other suitable, removable fastening means to the respective honeycomb panels. Likewise, the generally horizontal arms of the flanges 96 and 98 are joined by similar fasteners to the wing skin 10a and to the horizontal arm of the wing rib 18.

Although all ribs and connection points of the upper and lower portions 40b, 40c, and 42d of the rear sections of the inboard and outboard beams are not shown, the means by which they are attached is generally similar. Also, the beams 40 and 42 can be secured to the wing by a continuous flange running from the rear terminus of the upper portion of the rearward sections of the beams forwardly and around the leading edge panel and thereafter rearwardly to the rear terminus of the lower portions of the rearward sections of the beams. Such continuous flanges would have an L-shaped cross-section, as do the flanges 96 and 98, and would be secured to the surfaces of the wing and to the beams in a manner very similar to the flanges 96 and 98.

The present invention has been described in relation to a preferred embodiment. One of ordinary skill in the art is capable of altering the preferred embodiment to suit a given application and is further capable of making other changes and substitutions of equivalents without departing from the broad concepts disclosed herein. For example, the forward portion of the side beams need not be arcuate if the engine mounting assembly is not to be used as an integral part of the engine nacelle and internal cowling structure. What is important is that the engine is cantilevered forwardly from the wing and that the rearward sections of the inboard and outboard beams have upper and lower portions that wrap around and conform to the upper and lower wing surfaces and that attach directly to the wing skin and internal wing structure. It is therefore intended that the present invention be limited only by the definition contained in the appended claims.

What is claimed is:

1. An assembly for mounting an engine on an aircraft wing said wing having an upper airfoil surface and a lower airfoil surface said assembly having a definitional geometry including a longitudinal axis about which lie upper and lower inboard quadrants and upper and lower outboard quadrants, said longitudinal axis extending forwardly from said wing, said assembly comprising:

an inboard beam having a forward section and a rearward section, said inboard beam being spaced inwardly from and oriented along said longitudinal axis,
1. said forward section projecting forwardly from said wing, said forward section having a forward portion and a rearward portion, the forward portion of said forward section extending from said upper inboard quadrant to said lower inboard quadrant, the rearward portion of said forward section extending from said upper inboard quadrant to said lower inboard quadrant,
2. the rearward section of said beam having an upper portion and a lower portion, said upper and lower portions of said rearward section being joined to and extending longitudinally rearwardly from said forward section, said upper portion extending rearwardly over the upper surface of said wing, said lower portion extending rearwardly under said lower surface of said wing, said rearward section having a forwardly extending recess therein, said recess having an upper edge on said upper portion and a lower edge on said lower portion, the upper edge of said recess substantially conforming to the shape of and engaging the upper surface of said wing, and the lower edge of said recess substantially conforming to the shape of and engaging the lower surface of said wing, and b. an outboard beam having a forward section and a rearward section, said outboard beam being oriented along and spaced outwardly from said longitudinal axis, said outboard beam being separate from and spaced from said inboard beam,
1. said forward section projecting forwardly from said wing, said forward section having a forward portion and a rearward portion, the forward portion of said forward section extending from said upper outboard quadrant to said lower outboard quadrant, the rearward portion of said forward section extending from said upper outboard quadrant to said lower outboard quadrant,
2. the rearward section of said outboard beam having an upper portion and a lower portion, said upper and lower portions of said rearward section being joined to and extending longitudinally rearwardly from said foward section of said outboard beam, said upper portion extending rearwardly over the upper surface of said wing, said lower portion extending rearwardly under said lower surface of said wing, said rearward section having a forwardly extending recess therein, said recess having an upper edge on said upper portion and a lower edge on said lower portion, the upper edge of said recess substantially conforming to the shape of and engaging the upper surface of said wing, and the lower edge of said recess substantially conforming to the shape of and engaging the lower surface of said wing, c. means for securing the upper and lower portions of said rearward sections of said inboard beam and said outboard beam to the surfaces of said wing, and d. means for securing an engine at a central location between said beams such that said engine is cantilevered from said wing at a location forwardly of said wing.

2. The assembly of claim 1 further comprising:
an upper stabilizing member being oriented transversely to said longitudinal axis and extending from said upper outboard quadrant to said upper inboard quadrant, said upper stabilizing member being joined to the upper portion of said outboard beam in said upper outboard quadrant and being joined to the upper portion of said inboard beam in said upper inboard quadrant.

3. The assembly of claim 2 further comprising:
a lower stabilizing member being oriented transversely to said longitudinal axis and extending from said lower outboard quadrant to said lower inboard quadrant, said lower stabilizing member being joined to the lower portion of said outboard beam in said lower outboard quadrant and being joined to said inboard beam in said lower inboard quadrant.

4. The assembly of claim 3 wherein said upper and lower stabilizing members are joined to said inboard and outboard beams adjacent the junction of said forward and rearward sections thereof.

5. The assembly of claim 1 wherein at least the forward sections of said inboard and outboard beams are arcuate relative to and about said longitudinal axis.

6. The assembly of claim 3 wherein at least the forward sections of said inboard and said outboard beams are arcuate relative to and about said longitudinal axis, and wherein said upper and lower stabilizing members are arcuate relative to and about said longitudinal axis.

7. The assembly of claim 6 wherein said engine comprises a jet propulsion engine having a longitudinal center line, said forward sections of said inboard and outboard beams and said upper and lower stabilizing members having inner and outer surfaces, said inner surfaces being substantially equidistantly spaced in the radial dimension from said longitudinal axis, said means for securing said engine to said beams position the longitudinal center line of said engine substantially coincident with said longitudinal axis.

8. The assembly of claim 5 wherein the forward portion of the forward section of each of the inboard and outboard beams has an arc length greater than than arc length of the rearward portion of the forward section of each of the inboard and outboard beams, said forward sections of each of the inboard and outboard beams having upper and lower edges that gradually taper toward each other in a rearward direction.

9. The assembly of claim 5 further comprising an annularly-shaped forward stabilizing member having inboard and outboard side portions respectively positioned forwardly of the forward portions of the forward sections of said inboard and outboard beams, said forward stabilizing member surrounding said longitudinal axis and being oriented transversely relative to said axis, and means attaching said forward stabilizing member to the forward portions of the forward sections of said inboard and outboard beams.

10. The assembly of claim 9 wherein said means for attaching said forward stabilizing member comprises:

upper and lower projections affixed to and extending forwardly from the forward portion of the forward section of said inboard beam, said upper projection being located in said upper inboard quadrant and being affixed to said forward stabilizing member, said lower projection being located in said lower inboard quadrant and being affixed to said forward stabilizing member, and upper and lower projections affixed to and extending forwardly from the forward portion of the forward section of said outboard beam, said upper projection being located in said upper outboard quadrant and being affixed to said forward stabilizing member, said lower projection being located in said lower outboard quadrant and being affixed to said forward stabilizing member.

11. The assembly of claim 5
wherein said outboard beam comprises an outer and an inner wall, said outer wall being spaced from said inner wall and being joined to said inner wall by a plurality of internal structural members so constructed and arranged as to separate and secure said inner and outer walls in a predetermined spaced relationship, and wherein said inboard beam comprises an inner wall and an outer wall, said inner wall being spaced from said outer wall and being joined thereto by a plurality of internal structural members so constructed and arranged as to separate and secure said walls in a predetermined spaced relationship.

12. The assembly of claim 11 wherein said lower stabilizing member comprises an inner wall and an outer wall, said inner wall being joined to said outer wall by a plurality of structural members so constructed and arranged as to separate and secure said walls in a predetermined, spaced relationship, and wherein said upper stabilizing member comprises an inner wall and an outer wall, said inner wall being joined to said outer wall by a plurality of structural members so constructed and arranged as to separate and secure said walls in a predetermined, spaced relationship.

13. The assembly of claim 12 wherein said inner and outer walls of said beams and said upper and lower stabilizing members comprises honeycomb panels.

14. An assembly for mounting a jet propulsion engine on an aircraft wing, said wing having an upper surface and a lower surface, said assembly having a definitional geometry including a longitudinal axis about which lie upper and lower inboard quadrants and upper and lower outboard quadrants, said engine having a longitudinal centerline, said longitudinal axis extending forwardly from said wing, said assembly comprising:

a. an inboard beam having a forward section and a rearward section, said inboard beam being spaced inwardly from and oriented along said longitudinal axis,
  1. said forward section projecting forwardly from said wing, said forward section having a forward portion and a rearward portion, the forward portion of said forward section extending from said upper inboard quadrant to said lower inboard quadrant, the rearward portion of said forward section extending from said upper inboard quadrant to said lower inboard quadrant,
  2. the rearward section of said beam having an upper portion and a lower portion, said upper and lower portions of said rearward section being joined to and extending longitudinally rearwardly from said forward section, said upper portion extending rearwardly over the upper surface of said wing, said lower portion extending rearwardly under said lower surface of said wing, said rearward section having a forwardly extending recess therein, said recess having an upper edge on said upper portion and a lower edge on said lower portion, the upper edge of said recess substantially conforming to the shape of and engaging the upper surface of said wing, and the lower edge of said recess substantially conforming to the shape of and engaging the lower surface of said wing, and b. an outboard beam having a forward section and a rearward section, said outboard beam being oriented along and spaced outwardly from said longitudinal axis,
  1. said forward section projecting forward from said wing, said forward section having a forward portion and a rearward portion, the forward portion of said forward section extending from said upper outboard quadrant to said lower outboard quadrant, the rearward portion of said forward section extending from said upper outboard quadrant to said lower outboard quadrant,
  2. the rearward section of said outboard beam having an upper portion and a lower portion, said upper and lower portions of said rearward section being joined to and extending longitudinally rearwardly from said forward section of said outboard beam, said upper portion extending rearwardly over the upper surface of said wing, said lower portion extending rearwardly under said lower surface of said wing, said rearward section having a forwardly extending recess therein, said recess having an upper edge on said upper portion and a lower edge on said lower portion, the upper edge of said recess substantially conforming to the shape of and engaging the upper surface of said wing, and the lower edge of said recess substantially conforming to the shape of and engaging the lower surface of said wing, c. means for securing the rearward sections of said inboard beam and said outboard beam to said wing, d. means for securing an engine at a central location between said beams such that said engine is cantilevered from said wing at a location forwardly of said wing, e. an annularly-shaped forward stabilizing member having inboard and outboard side portions respectively positioned forwardly of the forward portions of the forward sections of said inboard and outboard beams, said forward stabilizing member surrounding said longitudinal axis and being oriented transversely relative to said axis, and f. means for attaching said forward stabilizing member to the forward portions of the forward sections of said inboard and outboard beams including
  1. upper and lower projections affixed to and extending forwardly from the forward portion of the forward section of said inboard beam, said upper projection being located in said upper inboard quadrant and being affixed to said forward stabilizing member, said lower projecting being located in said lower inboard quadrant and being affixed to said forward stabilizing member, and 2. upper and lower projections affixed to and extending forwardly from the forward portion of the forward section of said outboard beam, said upper projection being located in said upper outboard quadrant and being affixed to said forward stabilizing member, said lower projection being located in said lower outboard quadrant and being affixed to said forward stabilizing member, g. at least the forward sections of said inboard and outboard beams being arcuate relative to and about said longitudinal axis, said forward sections of said inboard and outboard beams and said upper and lower stabilizing members having inner and outer surfaces, said inner surfaces being substantially longitudinally spaced in the radial dimension from said longitudinal axis, said means for securing said engine to said beams positioning the longitudinal center line of said engine substantially conicident with said longitudinal axis, and said means for affixing said jet propulsion engine to said assembly comprising a first plurality of bracket members affixed to each of said upper and lower inboard projections, outboard projections, and a second plurality of bracket members affixed to the upper and lower, rearward portions of said inboard beam and said outboard beam.

15. An assembly for mounting an engine on an aircraft wing said wing having an upper surface and a lower surface said assembly having a definitional geometry including a longitudinal axis about which lie upper and lower inboard quadrants and upper and lower outboard quadrants, said longitudinal axis extending forwardly from said wing, said assembly comprising:

a. an inboard beam having a forward section and a rearward section, said inboard beam being spaced inwardly from and oriented along said longitudinal axis and being arcuate relative to and about said longitudinal axis, said outboard beam having an outer and an inner wall, said outer wall being spaced from said inner wall and being joined to said inner wall by a plurality of internal structural members so constructed and arranged as to separate and secure said inner and outer walls in a predetermined spaced relationship, 1. said forward section projecting forwardly from said wing, said forward section having a forward portion and a rearward portion, the forward portion of said forward section extending from said upper inboard quadrant to said lower inboard quadrant, the rearward portion of said forward section extending from said upper inboard quadrant to said lower inboard quadrant, 2. the rearward section of said beam having an upper portion and a lower portion, said upper and lower portions of said rearward section being joined to and extending longitudinally rearwardly from said forward section, said upper portion extending rearwardly over the upper surface of said wing, said lower portion extending rearwardly under said lower surface of said wing, said rearward section having a forwardly extending recess therein, said recess having an upper edge on said upper portion and a lower edge on said lower portion, the upper edge of said recess substantially conforming to the shape of and engaging the upper surface of said wing, and the lower edge of said recess substantially conforming to the shape of and engaging the lower surface of said wing, the upper portion of the rearward section of said inboard beam extending rearwardly from the forward section of said inboard beam and away from said longitudinal axis, b. an outboard beam having a forward section and a rearward section, said outboard beam being oriented along and spaced outwardly from said longitudinal axis and being arcuate relative to and about said longitudinal axis, said inboard beam having an inner wall and an outer wall, said inner wall being spaced from said outer wall and being joined thereto by a pluarality of internal structural members so constructed and arranged as to separate and secure said walls in a predetermined spaced relationship, 1. said forward section projecting forwardly from said wing, said forward section having a forward portion and a rearward portion, the forward portion of said forward section extending from said upper outboard quadrant to said lower outboard quadrant, the rearward portion of said forward section extending from said upper outboard quadrant to said lower outboard quadrant, 2. the rearward section of said outboard beam having an upper portion and a lower portion, said upper and lower portions of said rearward section being joined to and extending longitudinally rearwardly from said forward section of said outboard beam, said upper portion extending rearwardly over the upper surface of said wing, said lower portion extending rearwardly under said lower surface of said wing, said rearward section having a forwardly extending recess therein, said recess having an upper edge on said upper portion and a lower edge on said lower portion, the upper edge of said recess substantially conforming to the shape of and engaging the upper surface of said wing, and the lower edge of said recess substantially conforming to the shape of and engaging the lower surface of said wing, the upper portion of the rearward section of said outboard beam extending rearwardly from the forward section of said outboard beam and at least a portion of the rearward section of said outboard beam extends inwardly toward said longitudinal axis, c. means for securing the rearward section of said inboard beam and said outboard beam to said wing, and d. means for securing an engine at a central location between said beams such that said engine is cantilevered from said wing at a location forwardly of said wing.

16. An assembly for mounting an engine on an aircraft wing having a leading edge, an upper surface, and a lower surface, said engine having a longitudinal dimension and a transverse dimension comprising:

an inboard beam having a rearward section and a forward section, said rearward section having an upper portion and a lower portion, said upper portion extending in a chordwise direction over the upper surface of said wing and having a bottom edge conforming to the shape of and engaging the upper surface of said wing, said lower portion extending in a chordwise direction over the lower surface of said wing and having a bottom edge conforming to the shape of and engaging the lower surface of said wing, said forward section being cantilevered from said rearward section and projecting forwardly from the leading edge of said wing, a separate outboard beam having a rearward section and a forward section, said outboard beam being spaced outwardly in a spanwise direction from said inboard beam, said rearward section having an upper portion and a lower portion, said upper portion extending in a chordwise direction over the upper surface of said wing and having a bottom edge conforming to the shape of and engaging the upper surface of said wing, said lower portion extending in a chordwise direction over the lower surface of said wing and having an upper edge conforming to the shape of and engaging the lower surface of said wing, said forward section being cantilevered from said rearward section and projecting forwardly from the loading edge of said wing, means for securing said engine to and between said inboard and outboard beams, the forward sections of said inboard and outboard beams being spaced from each other by a distance at least as great as said transverse dimension of said engine so as to leave a space therebetween to allow insertion and removal of sqid engine in a generally downward and upward direction to and from a location between said beams, and means for securing the upper and lower portions of the rearward sections of said outboard beams respectively to the upper and lower surfaces of said wing.

\* \* \* \* \*

UNITED STATES PATENT AND TRADEMARK OFFICE
CERTIFICATE OF CORRECTION

PATENT NO. : 3,952,973
DATED : April 27, 1976
INVENTOR(S) : Varnell L. James

It is certified that error appears in the above-identified patent and that said Letters Patent are hereby corrected as shown below:

Column 14, line 45: delete "position" and insert therefor --positioning--.

Column 14, line 50: delete "than" second occurrence and insert therefor --the--.

Column 15, line 45: delete "comprises" and insert therefor --comprise--.

Column 16, line 19: delete "forward" second occurrence and insert therefor --forwardly--.

Column 16, line 66: delete "projecting" and insert therefor --projection--.

Column 17, line 20: delete "conicident" and insert therefor --coincident--.

Column 20, line 11: delete "sqid" and insert therefor --said--.

Signed and Sealed this

Twentieth Day of July 1976

[SEAL]

Attest:

RUTH C. MASON
*Attesting Officer*

C. MARSHALL DANN
*Commissioner of Patents and Trademarks*